(12) United States Patent
Tadama

(10) Patent No.: US 6,195,130 B1
(45) Date of Patent: Feb. 27, 2001

(54) VERTICAL TIMING SIGNAL GENERATING CIRCUIT

(75) Inventor: Masaru Tadama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/136,509

(22) Filed: Aug. 19, 1998

(30) Foreign Application Priority Data

Aug. 22, 1997 (JP) .................................................. 9-226121

(51) Int. Cl.$^7$ ..................................................... H04N 3/227
(52) U.S. Cl. ............................................. 348/511; 348/548
(58) Field of Search ..................................... 358/148, 153, 358/158, 154, 500; 348/536, 540, 546, 547, 548, 511; H04N 3/227, 3/27, 5/04, 5/08, 5/10

(56) References Cited

U.S. PATENT DOCUMENTS 5,717,467 * 2/1998 Shiki ..................................... 348/511

FOREIGN PATENT DOCUMENTS

| 60-25387 | 2/1985 | (JP) . | |
|---|---|---|---|
| 61-2347 | 1/1986 | (JP) . | |
| 61-264386 | 11/1986 | (JP) . | |
| 62-107576 | 5/1987 | (JP) . | |
| 1-320870 | 12/1989 | (JP) . | |
| 2-109469 | 4/1990 | (JP) . | |
| 4-3662 * | 1/1992 | (JP) | ............... H04N/3/227 |
| 7-154817 | 6/1995 | (JP) . | |

OTHER PUBLICATIONS

Patent Abstract—162 E 94.
Patent Abstract—Publication No.: 07154817 A.
Patent Abstract—128 E 322.
Patent Abstract—21 E 952.
Patent Abstract—88 E 901.
Patent Abstract—55 E 549.
Japanese Office Action 254380 dated Nov. 30, 1999 with Unexamined patent Application Publication (Kokai) No. 4–35272, 4–139963, 3–240371, 64–59388, 63–46076 and 63–85592, together with wavy line material and English translation thereof.

* cited by examiner

Primary Examiner—David E. Harvey
(74) Attorney, Agent, or Firm—Laff, Whitesel & Saret, Ltd.; J. Warren Whitesel; Charles A. Laff

(57) ABSTRACT

There is provided a vertical timing signal generating circuit which can operate stably irrespective of the phase relationship between a vertical synchronous signal and a vertical timing signal generated by a counter, and can provide a vertical timing signal having a desired phase. Delay circuit 100 receives vertical synchronous signal Pc 123, outputs as a reset signal a signal which is delayed in phase with respect to input vertical synchronous signal Pc 123 by a predetermined phase, and vertical counter 103 receives horizontal synchronous signal Pb 121 and reset signal Pe 125 outputted from delay circuit 100 and resets the count by using reset signal Pe 125 to count a predetermined number of horizontal synchronous signals 121, thereafter outputting vertical timing signal Pd 127.

4 Claims, 5 Drawing Sheets

F I G. 1A
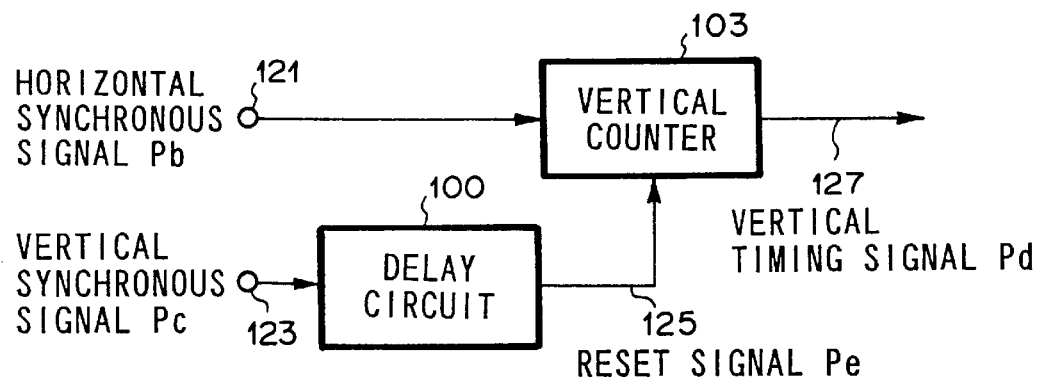
F I G. 1B
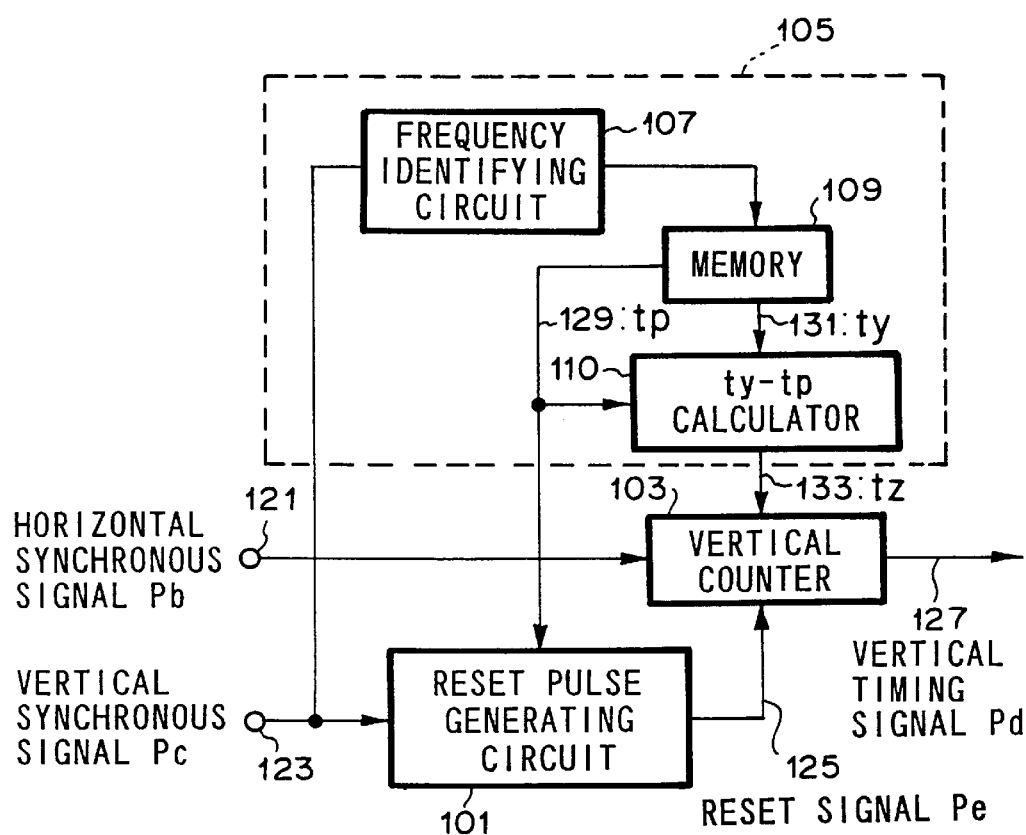

VERTICAL TIMING SIGNAL GENERATING CIRCUIT

BACKGROUND OF THE INVENTION

1. Field of the Invention

The present invention relates to a vertical timing signal generating circuit and, particularly to a vertical timing signal generating circuit for generating a vertical timing signal by counting the pulses of a horizontal synchronous signal using a counter.

2. Description of the Prior Art

Recently a picture display equipment for processing input signals with digital circuits, such as a liquid crystal display equipment, has been widely used as a display device. In such liquid crystal display equipment, generally, horizontal synchronous signals and vertical synchronous signals are input, and the timing corresponding to the vertical direction is controlled by a vertical timing signal in order to display a picture on an adequate vertical position.

In order to generate the vertical timing signal, there is used a method of using a horizontal synchronous signal as a clock signal, counting the clock signal with a counter and then generating the vertical timing signal after the counting operation.

According to this method, the vertical synchronous signal supplied to the picture display equipment is used as a reset signal for starting the counting operation of the counter in order to completely synchronize the phase of the vertical timing signal generated by the counter with the phase of the video signal supplied to the picture display equipment. The vertical timing signal which is generated by counting the horizontal synchronous signals using the counter is used as signal indicating an operation timing such as the start timing or end timing of a picture in the vertical direction.

Here, the above-mentioned counter will be explained. The above-mentioned counter is hereinafter referred to as "vertical counter". There has been hitherto broadly used a method in which the vertical counter for counting horizontal synchronous signals uses a horizontal synchronous signal or an Integral multiple of the horizontal signal as a clock signal while using a vertical synchronous signal as a reset signal for starting a counting operation.

Further, in order to stabilize the operation of the vertical counter in the case that the S/N ratio of the input signal is low or the input signal includes signals other than the original signal such as ghost signals, the clock signal is not directly supplied to the vertical counter, but supplied through a filter disposed in front of the vertical counter.

A conventional vertical timing signal generating circuit in this case will be explained with reference to FIG. 5 which is a block diagram showing the construction of the conventional vertical timing signal generating circuit As shown in FIG. 5, the conventional vertical timing signal generating circuit includes filter 401 to which a horizontal synchronous signal Pb 405 is supplied, and vertical counter 403 to which a clock signal output from filter 401 and vertical synchronous signal Pc 407 are supplied and from which vertical timing signal Pd 409 is output.

As described above, the filter 401 is used for stabilizing the operation of vertical counter 403 when the S/N ratio of the input signals is low or the input signal contains the signal other than the original signal such as ghost signals. Vertical counter 403 counts the clock signal output from filter 401 and outputs vertical timing signal 409.

Next, the timing of each signal in the conventional vertical timing signal generating circuit shown in FIG. 5 will be explained with reference to FIG. 6.

FIG. 6 shows a timing chart for video signal Pa 501A (not shown in FIG. 5), horizontal synchronous signal Pb 405A, vertical synchronous signal Pc 407A and vertical timing signal Pd 409A. FIG. 6 shows a timing chart during one vertical scanning period of vertical synchronous signal Pc 407A.

It is now assumed, for example, that vertical timing signal Pd 409A has a phase relationship as shown in FIG. 6 where it is shown that vertical timing signal 409 becomes active (high) when the active area of video signal Pa 501A ends. In FIG. 6, tv represents one vertical scanning period (it is also referred to as "one period") of vertical synchronous signal Pc 407A, and ty represents the phase difference between vertical synchronous signal Pc 407A and vertical timing signal Pd 409A. In this case, ty represents how many clocks are counted by vertical counter 403.

As shown in FIG. 6, vertical timing signal Pd 409A becomes active (high) after predetermined number has been counted up by vertical counter 403 which was reset by vertical synchronous signal Pc 407A.

Next, the operation in such a case that the phase difference between the vertical synchronous signal and the video signal depends on the equipment outputting these signals will be explained. For example, this case is caused when the vertical timing signal generating circuit is connected to various personal computers.

In this case, an adjustment of the display frame position in the vertical direction is needed. FIG. 7 is a timing chart of respective signals in this case. FIG. 7 shows a timing chart for video signal Pa 501B, horizontal synchronous signal Pb 405B, vertical synchronous signal Pc 407B and vertical timing signal Pd 409B.

Similarly to the case of FIG. 6. FIG. 7 shows one vertical scanning period of the vertical synchronous signal. The phase difference between vertical synchronous signal Pc 407B and vertical timing signal Pd 409B in the case of FIG. 7 is different from the case of FIG. 6. This phase difference in each case is adjusted by varying the number of count of vertical counter 403. Therefore, the phase difference between video signal Pa 501A (501B) and vertical timing signal 409A (409B) can be kept constant, even when the phase difference between video signal 501A (501B) and vertical synchronous signal 407A (407B) varies.

However, in the above-explained conventional vertical timing signal generating circuit. when the period of the vertical synchronous signal becomes shorter than its original period, there occurs a case where the vertical counter is reset before it completes the counting operation In this case, when the phase control is made so that the vertical timing signal is obtained by the counter just before the input vertical synchronous signal, there is a case where the vertical timing signal does not become active.

This problematic situation will be explained with reference to FIG. 8. FIG. 8 is a timing chart of each signal shown in FIG. 5.

From the comparison between the timing chart shown in FIG. 8 and the timing chart shown in FIG. 7, it is observed that one vertical scanning period tv of vertical synchronous signal Pc 407C of FIG. 8 is shorter than that of FIG. 7 by n. This shortening occurs due to the characteristic of a signal generating equipment such as a VCR, a personal computer the like to which the vertical timing signal generating circuit is connected.

When tv is shorter by n, the pulse of vertical timing signal 409C which would originally appear at point S does not appear because vertical counter 403 is reset by vertical synchronous signal 407C before vertical counter 403 count up horizontal synchronous signal 405C for period ty.

Further, then the phase difference between vertical synchronous signal and video signal is varied every equipment as in the case of video signals generated by a personal computer, it is needed to adjust the display frame position in the vertical direction by varying the phase relationship between vertical synchronous signal and vertical timing signal generated by vertical counter 403. However, when the count value to be counted by vertical counter 403 is changed in order to adjust the phase of vertical timing signal, the counting operation of vertical counter 403 may not be carried out, even when the vertical synchronous signal is supplied, and thus vertical timing signal 409C may not be generated.

This problematic situation will be explained with reference to FIG. 9. FIG. 9 is a timing chart of each signal in the conventional vertical timing signal generating circuit shown in FIG. 5.

It is assumed now that video signal Pa 501D and vertical synchronous signal Pc 407D are input while having such a phase relationship as shown in the timing chart of FIG. 9. In order to activate vertical timing signal Pd 409D when active area of video signal Pa 501D ends, phase difference ty between vertical synchronous signal Pc 407D and vertical timing signal Pd 409D must be adjusted as shown in FIG. 9. In this case, the phase relationship between vertical synchronous signal Pc 407D and vertical timing signal Pd 409D is set so that vertical counter 403 is reset by vertical synchronous signal Pc 407D just before vertical counter 403 completes its counting operation, and thus vertical timing signal Pd 409D never becomes active.

As explained above, there occurs a case where the active pulse of vertical timing signal 409 is not generated when the vertical frame position adjustment is performed for signals supplied from, for example, a personal computer.

SUMMARY OF THE INVENTION

The present invention has been made in order to overcome the aforementioned disadvantages, and has an object to provide a vertical timing signal generating circuit which operates stably irrespective of the phase relationship between the vertical synchronous signal and the vertical timing signal generated by a counter, and can generates the vertical timing signal having a desired phase.

According to the first aspect of the present invention, there is provided a vertical timing signal generating circuit which comprises: delayed signal output means for receiving a vertical synchronous signal and outputting a delayed signal which is delayed in phase relative to the vertical synchronous signal by a predetermined phase; and counting means for receiving a horizontal synchronous signal and the delayed signal, resetting a count by the delayed signal, counting a predetermined number of pulses of the horizontal synchronous signal, and then outputting the vertical timing signal.

According to the vertical timing signal generating circuit of the first aspect of the present invention, the signal which is synchronized with the vertical synchronous signal input to the count means is not directly used as the reset signal, and the signal which is delayed in phase with respect to the vertical synchronous signal by a predetermined phase is used as the reset signal for the count means. Therefore, even when the period of the vertical signal is varied or the set value of the count value of the count means is varied, it can be prevented that no vertical signal is generated by the count means.

The predetermined phase may be given by one half of the vertical scanning period of the vertical synchronous signal.

Therefore, the case where no vertical timing signal occurs can be more efficiently avoided.

According to the second aspect of the present invention, there is provided a vertical timing signal generation circuit which comprises: setting means for receiving a vertical synchronous signal and outputting a phase delay amount relative to the vertical synchronous signal and a count number of pulses of horizontal synchronous signal on the basis of the vertical synchronous signal; delayed signal outputting means which receives the vertical synchronous signal and the phase delay amount, and outputting as a delayed signal a signal delayed in phase relative to the vertical synchronous signal by the phase delay amount; and counting means for receiving a horizontal synchronous signal, the delayed signal, and the count number, resetting a count by the delayed signal, counting pulses of the horizontal synchronous signal by the count number, and then outputting the vertical timing signal.

According to the vertical timing signal generating circuit of the second aspect of the present invention, the setting means outputs the delay amount of the phase with respect to the vertical synchronous signal and the count number of the pulses of the horizontal synchronous signal in the counting means, on the basis of this output value, the delayed signal output means outputs the delayed signal whose phase is delayed with respect to that of the vertical synchronous signal, and the counting means counts the horizontal synchronous signals by using this delay signal as a reset signal to output the vertical timing signal. Therefore, even when the period of the vertical synchronous signal varies or the set value of the count value of the count means is varied, it can be prevented that no vertical timing signal is generated from the count means.

The setting means may comprise frequency detecting means for receiving the vertical synchronous signal and detecting the frequency of the vertical synchronous signal in order to output a frequency data, and calculating means for receiving the frequency data and generating the phase delay amount and the count number in accordance with the frequency.

Therefore, the phase delay amount with respect to the vertical synchronous signal and the count number of pulses of the horizontal synchronous signal can be easily determined.

The calculating means may include storage means for receiving the frequency data, storing plural phase delay amounts and cyclic times of the vertical timing pulse corresponding to various values of the frequency data, and selecting and outputting the phase delay amount and cyclic time corresponding to the received frequency data, and calculation means for receiving the phase delay amount and the cyclic time, and subtracting the phase delay from the cyclic time in order to generate the count number. Alternatively, the calculating means may includes storage means for receiving the frequency data, storing plural phase delay amounts and count numbers corresponding to various values of the frequency data, and selecting and outputting the phase delay amount and count number corresponding to the received frequency data. Therefore, the vertical timing signal generating circuit may cope with various kinds of video signal formats.

Next, the operation of the vertical timing signal generating circuit according to the present invention will be explained with reference to FIGS. 2 and 3.

FIG. 2 shows a timing chart of each signal of the vertical timing signal generating circuit according to the present invention. FIG. 2 shows the timing chart of video signal Pa 201A, horizontal synchronous signal Pb 121A, vertical synchronous signal Pc 123A, reset signal Pe 125A and vertical timing signal Pd 127A.

In FIG. 2, tv represents the period of the vertical synchronous signal Pc 123A, ty represents the time from the leading edge of vertical synchronous signal Pc 123A to the leading edge of vertical timing signal Pd 127A, that is, the phase difference between vertical synchronous signal Pc 123A and vertical timing signal Pd 127A, tp represents the delay amount of reset signal Pe 125A and tz represents the set amount of the count number which is counted by the vertical counter, and it is assumed that these signals have the following timing relationship: tp=tv/2, ty=tp+tz.

Next, a case where tv shown in FIG. 2 becomes shorter by n will be explained with reference to FIG. 3. Even when tv is shorted down to an point R as shown in FIG. 3, reset signal Pe 125B for resetting the vertical counter is delayed with respect to vertical synchronous signal Pc 123B by tp, and thus there is no case that vertical timing signal Pd 127B is not output.

Although it is observed that delay amount tp may take the value other than tv/2, it can be understood that the effect of preventing the case that no vertical timing signal is generated can be maximized under the condition that delay amount tp is tv/2 when It is taken into account that the vertical timing signal Pd is adjusted in the vicinity of vertical synchronous signal Pc.

BRIEF DESCRIPTION OF THE DRAWINGS

FIGS. 1A is block diagrams showing embodiments of a vertical timing signal generating circuit according to the present invention;

FIG. 1B is a block diagram showing the detailed construction of a first embodiment of the vertical timing signal generating circuit;

DETAILED DESCRIPTION OF THE PREFERRED EMBODIMENTS

Figure 2:
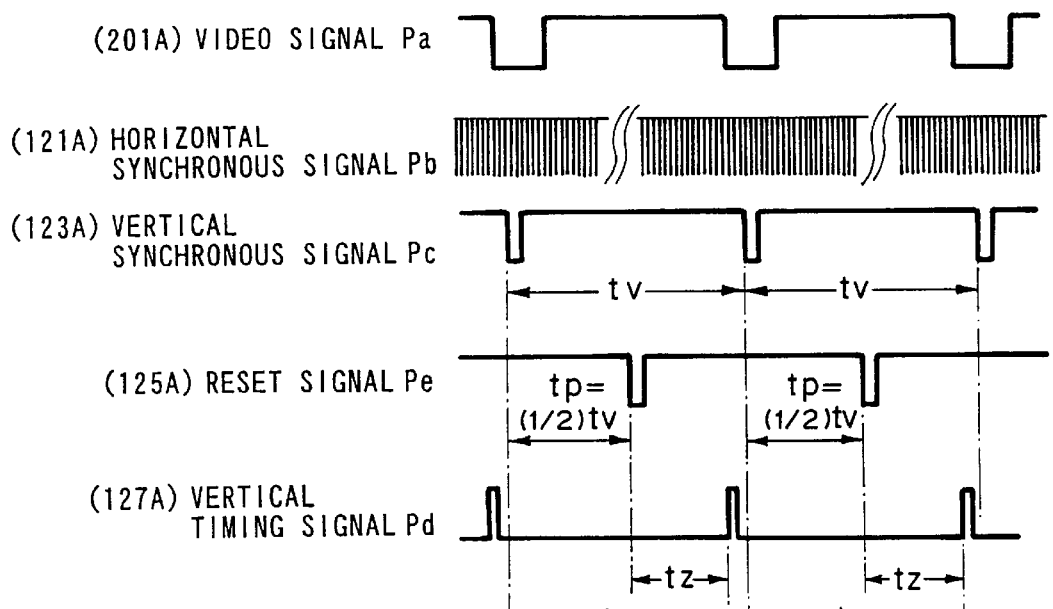
FIG. 2 is a timing chart of each signal of the vertical timing signal generating circuit shown in FIG. 1B.

The preferred embodiments according to the present invention will be explained hereunder with reference to the accompanying drawings.

FIGS. 1A and 1B are block diagrams showing an embodiment of the vertical timing signal generating circuit of the present invention, wherein FIG. 1A is a block diagram showing the construction of the embodiment of the vertical timing signal generating circuit according to the present invention, and FIG. 1B is a block diagram showing the detailed construction of the embodiment of the present invention.

The vertical timing signal generating circuit shown in FIG. 1A comprises delay circuit 100 to which vertical synchronous signal Pc 123 is supplied, and vertical counter 103 for outputting vertical timing signal Pd 127.

Delay circuit 100 outputs to vertical counter 103 reset signal Pe 125 which is delayed in phase with respect to input vertical synchronous signal Pd 123 by a predetermined phase.

Vertical counter 103 starts its counting operation using horizontal synchronous signal Pb 121 as a clock after being reset by reset signal Pe 125, and outputs vertical timing signal Pd 127 after the counting operation.

Here, the phase delay T in delay circuit 100 is preferably takes the value given by the equation: T=tv/2 where one vertical scanning period of vertical synchronous signal Pd 123 is represented by tv. In this case, the effect which is to prevent occurrence of the case where no vertical timing signal pulse is generated, can be enhanced to the maximum.

Next, the vertical timing signal generating circuit show in FIG. 1A will be explained in detail with reference to FIG. 1B. FIG. 1B shows the more detailed construction of the vertical timing signal generating circuit shown in FIG. 1A. The same members and signals as shown in FIG. 1A are represented by the same reference numerals in FIG. 1B.

The first embodiment of the vertical timing signal generating circuit shown in FIG. 1B includes reset pulse generating circuit 101 which receives vertical synchronous signal Pc 123 and outputs reset signal Pe 125, vertical counter 103 which receives horizontal synchronous Pb 121 and outputs vertical timing signal Pd 127, and setting circuit 105 which receives vertical synchronous signal Pc 123 and outputs delay amount tp 129 and count number tz 133.

The relationship between the vertical timing signal generating circuit shown in FIG. 1A and the vertical timing signal generating circuit shown in FIG. 1B is as follows. A Pair of reset pulse generating circuit 101 and setting circuit 105 shown in FIG. 1B correspond to delay circuit 100 shown in FIG. 1A, and vertical counter 103 shown in FIG. 1A corresponds to vertical counter 103 shown in FIG. 1B.

Setting circuit 105 shown in FIG. 1B includes a frequency identifying circuit 107 for receiving vertical synchronous signal Pc 123 and outputting a frequency identification signal, memory 109 for receiving the frequency identification signal and outputting delay amount tp 129 and period ty 131 indicating the period of the vertical timing signal, and ty–tp calculation circuit 110 for receiving delay amount tp 129 and period ty 131 to calculate the difference therebetween, and outputting count number tz 133 which is the result of the calculation.

Here, setting circuit 105 may be constructed by a microcomputer or the like.

Next, the operation of the vertical timing signal generating circuit shown in FIG. 1B will be explained with reference to FIGS. 1B and 2. FIG. 2 shows the timing chart of each signal of the vertical timing signal generating circuit shown in FIG. 1B.

FIG. 2 shows the timing chart of video signal Pa 201A, horizontal synchronous signal Pb 121A, vertical synchronous signal Pc 123A, reset signal Pe 125A and vertical timing signal Pd 127A.

First, as shown in FIG. 1B, vertical synchronous signal Pc 123 is supplied to frequency identifying circuit 107. Frequency identifying circuit 107 identifies the frequency of vertical synchronous signal Pc 123.

The information on the frequency of vertical synchronous signal 123 which is obtained by frequency identifying circuit 107 is supplied to memory 109. Memory 109 have beforehand stored the pair of the data of one period ty of the vertical timing signal 127 and the data of the delay amount tp of reset signal 125 for every frequencies of vertical synchronous signal 123 of various kinds of the input signals, and selects and outputs the data of the one period ty and the delay amount tp in accordance with the information on the frequency of vertical synchronous signal 123.

The data of delay amount tp 129 is supplied to reset pulse generating circuit 101. Reset pulse generating circuit 101 generates reset signal Pe 125 after inputting vertical synchronous signal Pc 123 on the basis of the data of delay amount tp 129. Reset signal Pe 125 is delayed in phase from vertical synchronous signal Pc 123 by delay amount tp 129.

Delay amount tp 129 and period ty 131 are supplied to ty–tp calculation circuit 110. Ty–tp calculation circuit 110 subtracts tp from ty in order to get count number tz 133 of vertical counter 103 and then outputs the data of count number tz 133 which is supplied to vertical counter 103 and set as the count number thereof.

Vertical counter 103 also receives horizontal synchronous signal Pb 121 as a clock signal and reset signal Pe 125 outputted from reset pulse generating circuit 101 as a reset signal, and carries out its counting operation in order to output vertical timing signal Pd 127 at the desired timing.

Here, the types of the data stored in memory 109 are not limited to the pair of the delay amount tp and the one period ty of the vertical timing signal, and they may be the pair of the delay amount tp and the count number tz. in this case, the same operation can be performed, and ty–tp calculation circuit 110 shown in FIG. 1B is unnecessary.

Next, the timing of each signal shown in FIG. 1B will be explained with reference to FIGS. 2 and 3.

FIG. 2 shows the timing chart of each signal of the vertical timing signal generating circuit shown in FIG. 1B, and specifically FIG. 2 shows the timing chart of video signal Pa 201A, horizontal synchronous signal Pb 121A, vertical synchronous signal Pc 123A. reset signal Pe 125A and vertical timing signal Pe 127A.

Reset signal Pe 125 show in FIG. 1 is delayed in phase with respect to vertical synchronous signal Pc 123 by tp=(½)tv. Here, tv represents one vertical scanning period of vertical synchronous signal Pc 123 as explained above.

The count number of horizontal synchronous signal Pb 121A which is counted by vertical counter 103 is set to tz. Accordingly, vertical counter 103 outputs vertical timing signal Pd 127A after the elapse of tz from the time when reset signal Pe 125A is supplied thereto.

Next, the case where the one vertical scanning period of vertical synchronous signal 123 is shortened will be explained with reference to FIG. 3.

Figure 3:
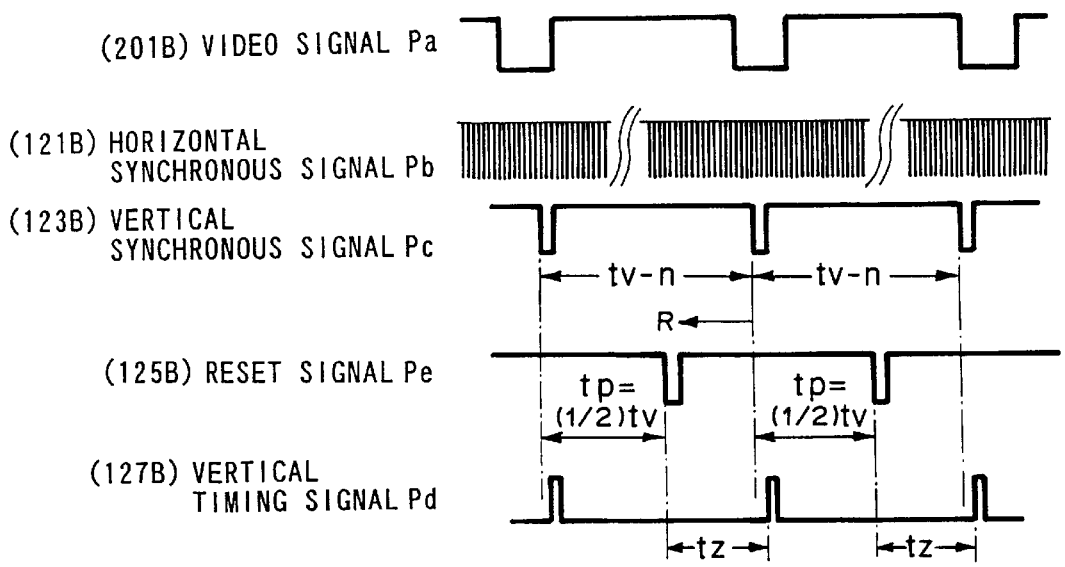
FIG. 3 is another timing chart of each signal of the vertical timing signal generating circuit shown in FIG. 1B.

FIG. 3 shows the timing chart of a video signal Pa 201B, horizontal synchronous signal Pb 121B, vertical synchronous signal Pc 123B, reset signal Pe 125B and vertical timing signal Pd 127B.

As observed from FIG. 3, one vertical scanning period of vertical synchronous signal Pc 123B is shorter by n as compared with that of FIG. 2B. However, reset signal Pe 125B is located at such a position that its phase is delayed with respect to vertical synchronous signal Pc 123B by tp=(½)tv, and vertical counter 103 counts from this position by the count number tz. Vertical timing signal Pd 127B is generated after this counting operation is completed, and thus there can be avoided such a disadvantage that no vertical timing signal pulse occurs.

Accordingly, according to the first embodiment of the vertical timing signal generating circuit shown in FIG. 1B, the signal which is delayed in phase with respect to the input vertical synchronous signal Pc 123 by a predetermined amount is set as reset signal Pe 125, and vertical counter 103 carries out the counting operation using reset signal Pe 125 in order to reset the counting operation and outputs the vertical timing signal Pe 127. Therefore, there can be prevented occurrence of such a situation that vertical counter 103 is reset and no vertical timing signal pulse is generated, which has frequently occurred in the conventional vertical timing signal generating circuit.

Figure 4:
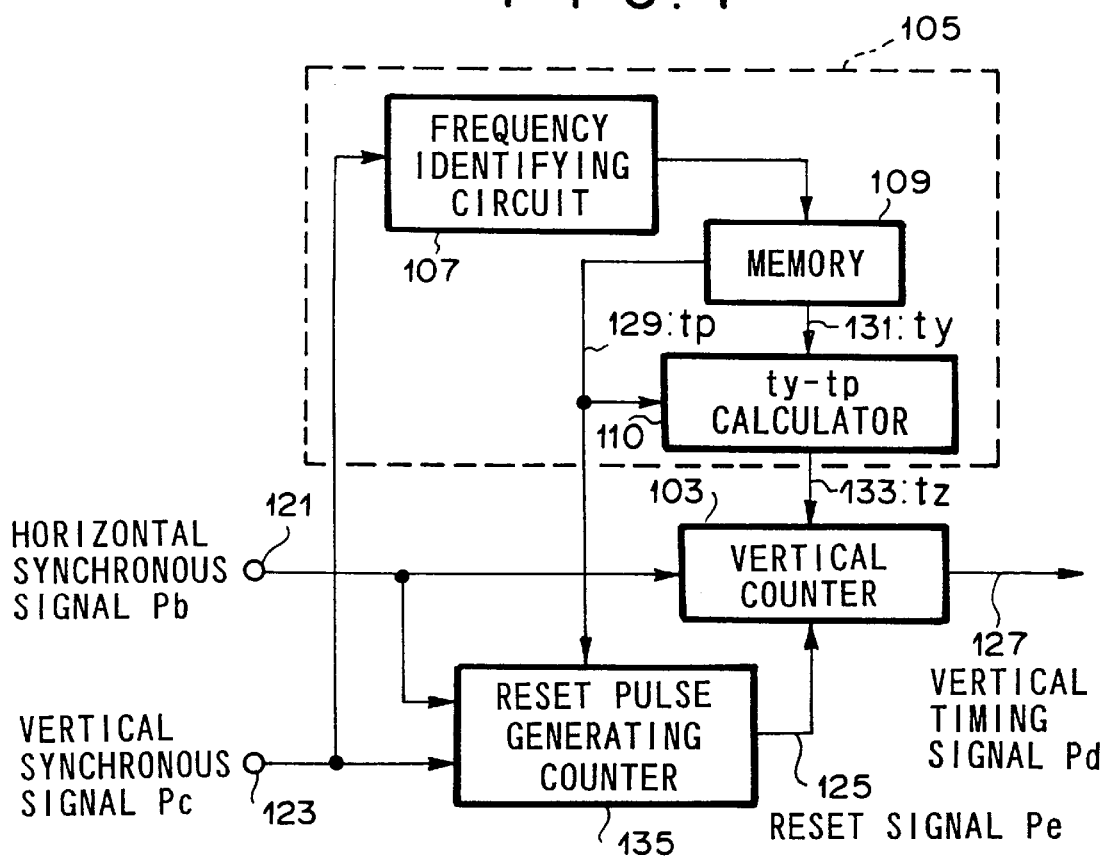
FIG. 4 is a block diagram showing the detailed construction of a second embodiment of the vertical timing signal generating circuit.

Next, the second embodiment of the vertical timing signal generating circuit shown in FIG. 1A will be described with reference to FIG. 4. FIG. 4 is a block diagram showing the construction of the second embodiment of the vertical timing signal generating circuit according to the present invention. The same members and signals as the vertical timing signal generating circuit shown in FIG. 1B are represented by the same reference numerals.

The difference of the vertical timing signal generating circuit shown in FIG. 4 from the vertical timing signal generating circuit shown in FIG. 1B resides in that reset pulse generating circuit 101 of the first embodiment shown in FIG. 1B is replaced by reset pulse generating counter (second vertical counter) 135 having the same function as vertical counter 103, and further horizontal synchronous signal Pd 121 is supplied to reset pulse generating counter 135 as a clock signal while vertical synchronous signal Pc 123 is supplied thereto as a reset signal, whereby reset pulse generating counter 135 performs counting operation in order to output reset signal Pe 125.

The timing chart of each signal of the vertical timing signal generating circuit shown in FIG. 4 is similar to FIGS. 2 and 3 which correspond to the timing chart of each signal shown in FIG. 1B, and thus the description thereof is omitted.

Accordingly, in the second embodiment, the same effect as the vertical timing signal generating circuit shown in FIG. 1B can be obtained.

Figure 5:
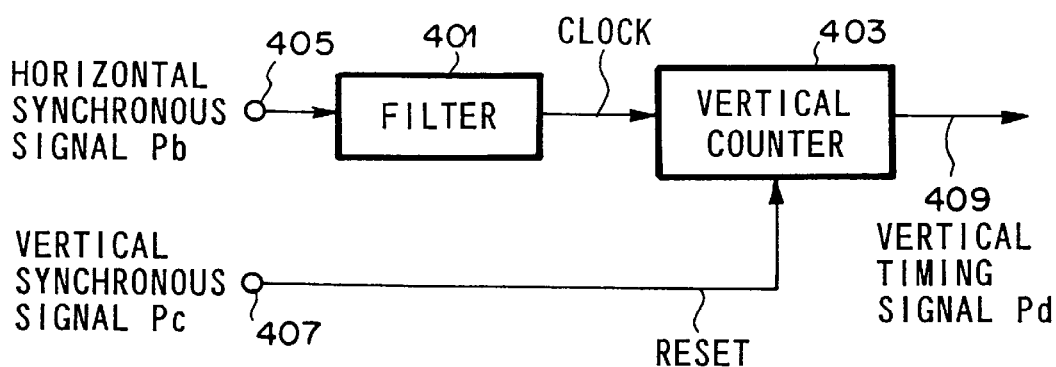
FIG. 5 is a block diagram showing the construction of a conventional vertical timing signal generating circuit.
Figure 6:
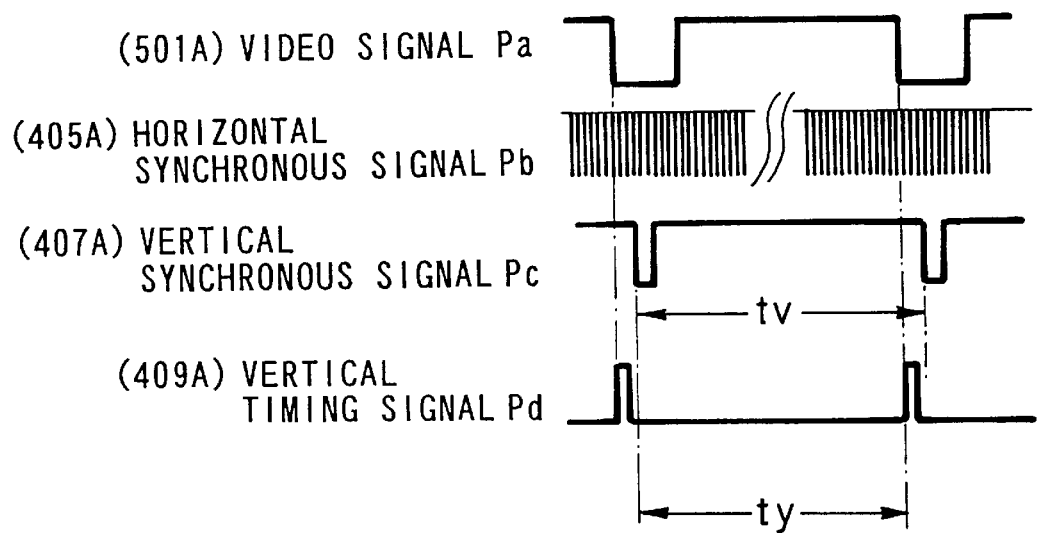
FIG. 6 is a first timing chart of each signal of the vertical timing signal generating circuit shown in FIG. 5.
Figure 7:
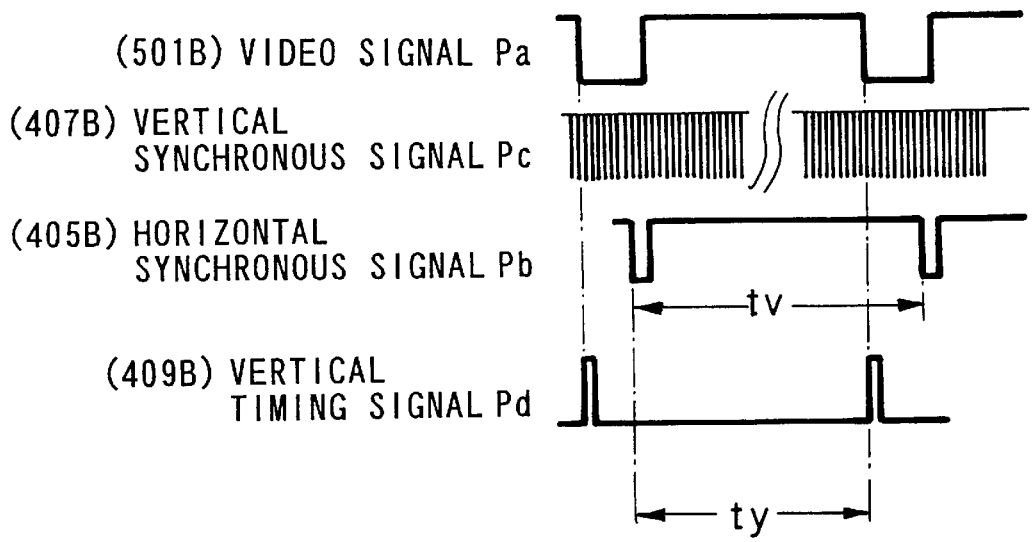
FIG. 7 is a second timing chart of each signal of the vertical timing signal generating circuit shown in FIG. 5.
Figure 8:
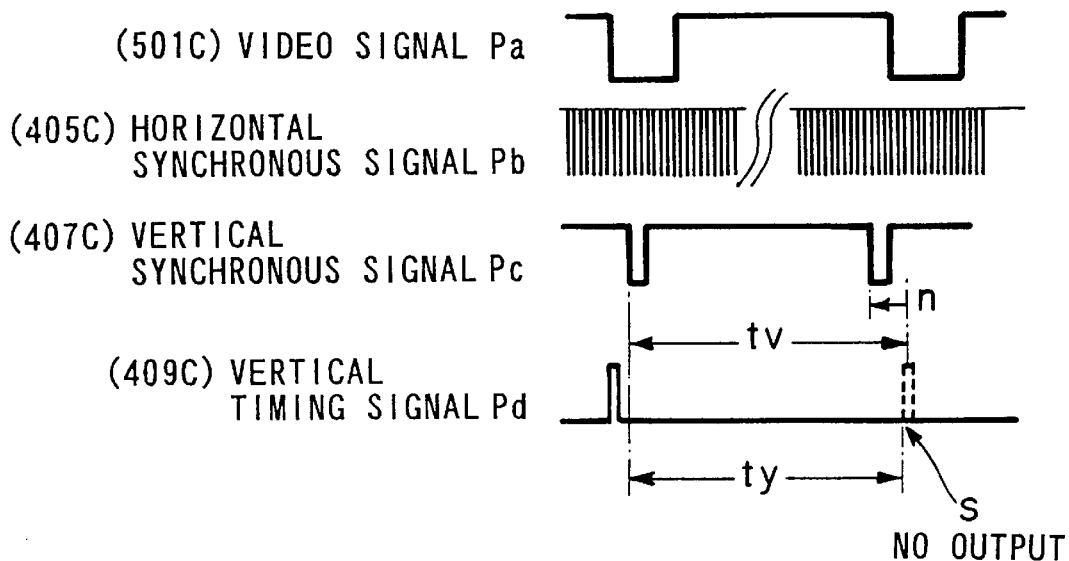
FIG. 8 is a third timing chart of each signal of the vertical timing signal generating circuit shown in FIG. 5.
Figure 9:
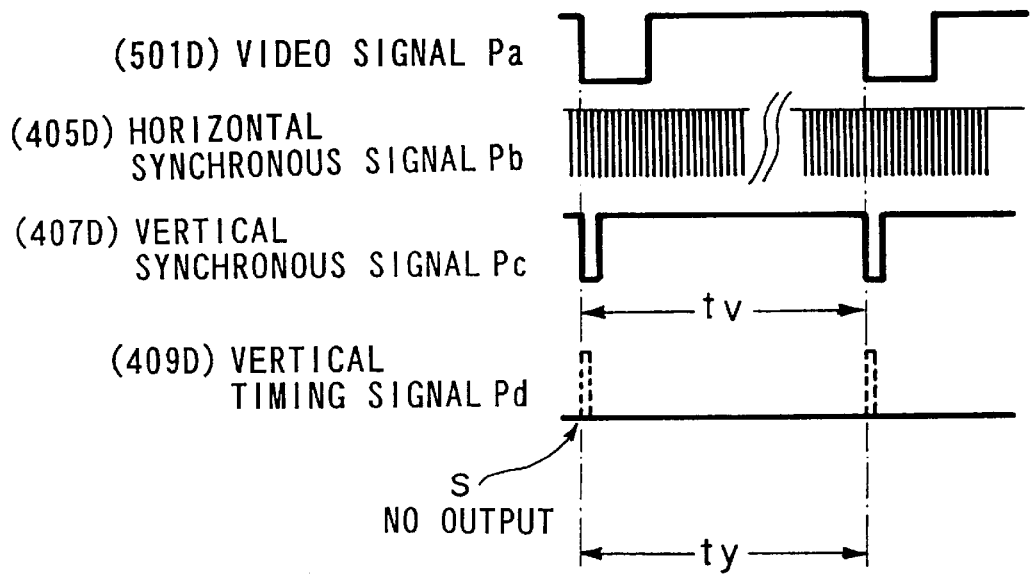
FIG. 9 is a fourth timing chart of each signal of the vertical timing signal generating circuit shown in FIG. 5.

Further, filter 401 as shown in FIG. 5 may be located just behind the input terminal of horizontal synchronous signal Pb 121. In this case, the operation of vertical counter 103 and reset pulse generating counter 135 can be more stabilized the operation when the S/N ration ratio of the input horizontal synchronous signal is low or when the original signal contains noises such as ghost signals, etc.

As is apparent from the foregoing description, according to the present invention, the vertical synchronous signal is not directly used as the reset signal of the vertical counter. Instead, the delayed vertical synchronous signal is used as the reset signal. Therefore, even when the vertical scan period of the vertical synchronous signal is shortened, the reset signal can be prevented from being supplied to the vertical counter before the vertical counter completes its counting operation. Therefore, the vertical timing signal generating circuit according to the present invention can surely generate the vertical timing signal pulse, even when the vertical scan period happens to become shorter than the original period in the state that the vertical timing signal generating circuit is adjust so that the vertical timing signal pulse is generated just before the vertical synchronous signal.

Further, according to the present invention, since the phase delay amount of the vertical timing signal pulse relative to the reset pulse can be adjusted around one half of the vertical scan period of the vertical synchronous signal, the vertical timing signal pulse can be stably generated at desired timing relative to the active area of the video signal and therefore, the vertical display frame position can be stably adjusted as desired.

What is claimed is:

1. A vertical timing signal generation circuit which comprises:

setting means for receiving a vertical synchronous signal and outputting a phase delay amount relative to said vertical synchronous signal and a count number of pulses of horizontal synchronous signal on the basis of said vertical synchronous signal;

delayed signal outputting means which receives said vertical synchronous signal and said phase delay amount, and outputs as a delayed signal a signal delayed in phase relative to said vertical synchronous signal by said phase delay amount; and counting means for receiving a horizontal synchronous signal, said delayed signal, and said count number, resetting a count by said delayed signal, counting pulses of said horizontal synchronous signal by said count number, and then outputting the vertical timing signal.

2. The vertical timing signal generating circuit as set forth in claim 1, wherein said setting means comprises frequency detecting means for receiving said vertical synchronous signal and detecting the frequency of said vertical synchronous signal in order to output a frequency data, and calculating means for receiving said frequency data and generating said phase delay amount and said count number in accordance with said frequency.

3. The vertical timing signal generating circuit as set forth in claim 2, wherein said calculating means includes storage means for receiving said frequency data, storing plural phase delay amounts and cyclic times of said vertical timing pulse corresponding to various values of said frequency data, and selecting and outputting the phase delay amount and cyclic time corresponding to said received frequency data, and calculation means for receiving said phase delay amount and said cyclic time, and subtracting said phase delay from said cyclic time in order to generate said count number.

4. The vertical timing signal generating circuit as set forth in claim 2, wherein said calculating means includes storage means for receiving said frequency data, storing plural phase delay amounts and count numbers corresponding to various values of said frequency data, and selecting and outputting the phase delay amount and count number corresponding to said received frequency data.

* * * * *